May 26, 1959            R. HILL            2,888,275
TRAILER CONNECTIONS FOR VEHICLES
Original Filed Nov. 24, 1951
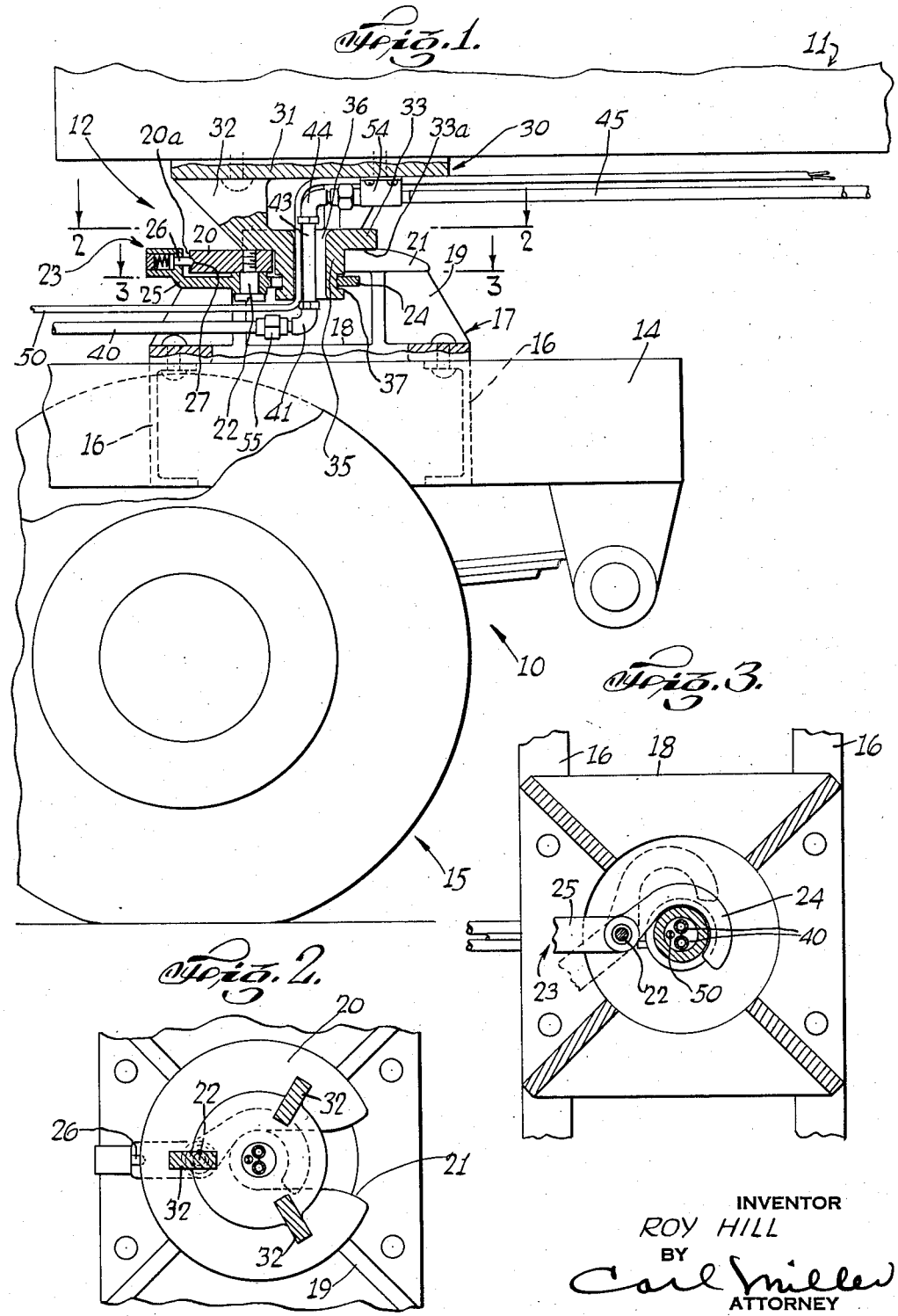
INVENTOR
ROY HILL
BY
ATTORNEY

United States Patent Office 2,888,275
Patented May 26, 1959

2,888,275

TRAILER CONNECTIONS FOR VEHICLES

Roy Hill, Provo, Utah

Substituted for abandoned application Serial No. 258,044, November 24, 1951. This application July 5, 1956, Serial No. 595,898

1 Claim. (Cl. 280—420)

This application is a substitute application for my application filed November 24, 1951, Serial No. 258,044, now abandoned.

This invention relates to trailer connection for vehicles and air line electric cables for the trailer.

Heretofore, connections of the air and light lines from the tractor or other vehicle to its trailer necessitated long hoses and wires which often become tangled and broken. It is therefore an object of the present invention to provide a highly improved connection for a trailer and for the air line and electric cables leading from the vehicle to the trailer, obviating the necessity for long dangling hoses and wires, and yet to permit turning of the trailer relative to the vehicle.

Yet a further object of this invention is to provide a strong and durable connection of the character described, which shall be relatively inexpensive to manufacture, and which shall yet be practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claim.

In the accompanying drawing, in which is shown one of the various possible illustrative embodiments of this invention, Fig. 1 is a side elevational view of the rear end of a vehicle and the front end of a trailer illustrating the connection for the trailer and the air and electric cables, embodying the invention, Fig. 2 is a cross-sectional view taken on line 2—2 of Fig. 1; and Fig. 3 is a cross-sectional view taken on line 3—3 of Fig. 1.

Referring now in detail to the drawing, 10 designates a vehicle, and 11 designates a trailer connected thereto by a connection 12 embodying the invention. The vehicle 10 comprises a frame 14 carried by the usual wheels 15. On the frame 14 are a pair of transverse channel shaped members 16, on which is mounted a base 17.

The base 17 comprises a bottom plate 18, from which there extends upwardly diagonal webs 19. At the upper end of the webs 19 is a horizontal, part-circular ring 20 open at its rear end, as at 21.

Pivoted to ring 20 at a point opposite the open end 21 thereof by a pivot pin 22, is a lever 23 having a hook portion 24 on one side of the pivot, and an arm 25 on the other side of the pivot carrying a spring pressed detent 26 adapted to press against the outer edge 20a of ring 20.

Ring 20 is formed with a socket 27 aligned with pivot 22 in the open end 21 of the ring, to receive the spring pressed detent 26 to retain the lever 23 in a position shown in full lines in Fig. 3 of the drawing, in which position the hook portion 24 connects the trailer to the vehicle in a manner to be explained hereinafter.

When the lever is swung in a counterclockwise direction, looking at Fig. 3 of the drawing, the hook 24 disengages the trailer as will likewise be explained hereinafter.

Attached to the underside of trailer 11, is a member 30 having a top wall 31 contacting the underside of the trailer, and fixed thereto by screws or rivets in the usual manner. Extending downwardly from top wall or plate 31 are radial ribs 32, and integrally formed with said ribs is an annular flat horizontal ring portion 33, from which there extends downwardly a tubular portion 35 formed with a through opening 36. At the lower end of the tubular portion 35 is an annular groove 37. The outer diameter of tubular portion 35 is such as to permit said tubular portion to pass through the opening 21 in ring 20. The lower end of tubular portion 35 is disposed below the ring 20 and the hook 24 is adapted to engage within the groove 37 to connect the trailer to the vehicle. The lower surface 33a of the flat portion 33 contacts the top surface of ring 20, as shown in Fig. 1 of the drawing.

Mounted on the vehicle 10, in any suitable manner and extending longitudinally thereof, is an air line 40. Attached to the rear end of air line 40 is an elbow 41 by means of an automatic push-on coupling 55 and extending upwardly and disposed just below the opening 36 in tubular portion 35.

Attached to elbow 41 by a swivel connection is a short air pipe 43 connected at its upper end by a swivel connection to an elbow 44. Elbow 44 is connected to an air line 45 on the trailer leading to the air brakes.

In the drawing there is furthermore shown an electric cable 50 which extends upwardly through opening 36, and is suitably supported in any suitable manner by the trailer. The air line 45 as well as the cable may be supported by a bracket 54.

It will now be understood that turning between the vehicle and the trailer is permitted through the swivel connections for the elbows 41 and 44. Thus, both the air line and the electric cable pass through the pivotal connection between the trailer and the vehicle.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:

In a tractor trailer vehicle a trailer connection including the combination of a member fixed upon the tractor with upwardly projecting supporting portions, a substantially horizontally flat crescent-shaped plate fixed upon the supporting portions with the opening in the crescent-shaped plate directed rearwardly, a hook disposed horizontally and pivoted beneath the plate immediately within the inner end of the opening therein and having an integral arm extending from the pivoted end of said hook beyond the outer arcuate edge of said crescent-shaped plate, a detent upon the end of said arm disposed in effective position to engage with the periphery of said plate, a horizontal plate fixed beneath the trailer and having a group of radially disposed pendent ribs integrally fixed thereto with a horizontal circular flange rigidly fixed to the lower ends of said ribs, a hollow circular member depending from said flange and forming an integral downward projection therefrom adapted to fit into the rear opening of the crescent-shaped plate and having a portion adaped to fit within said hook, said flange being adapted to rest upon said crescent-shaped plate when said hollow circular member fits into the latter plate, a fluid transmission conduit located upon the tractor, a second fluid transmission conduit located upon the trailer, an intermediate upright fluid transmission conduit extending through said hollow circular member and its flange, an elbow connecting the upper end of the intermediate fluid transmission conduit to the trailer fluid transmission conduit, an automatic push-on coupling releasably interconnecting the lower end of said intermediate fluid transmission conduit and the conduit upon said tractor, and an electric cable extending from the tractor to the trailer through said hollow circular member and its flange serving for electrical control and operation upon the tractor and trailer.

References Cited in the file of this patent

UNITED STATES PATENTS

| 2,043,610 | Eaton | June 9, 1936 |
| 2,062,806 | Casler | Dec. 1, 1936 |
| 2,250,825 | Evans | July 29, 1941 |
| 2,281,288 | Hettelsater | Apr. 28, 1942 |
| 2,667,365 | Hollifield | Jan. 26, 1954 |

FOREIGN PATENTS

| 422,122 | Great Britain | Dec. 31, 1934 |